(12) United States Patent
Maienschein

(10) Patent No.: US 8,381,515 B2
(45) Date of Patent: Feb. 26, 2013

(54) FORCE TRANSMISSION DEVICE

(75) Inventor: Stephan Maienschein, Baden-Baden (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 758 days.

(21) Appl. No.: 12/617,066

(22) Filed: Nov. 12, 2009

(65) Prior Publication Data
US 2010/0116613 A1   May 13, 2010

(30) Foreign Application Priority Data

Nov. 13, 2008  (DE) .......................... 10 2008 057 111

(51) Int. Cl.
*F16D 13/22* (2006.01)
*F16H 45/02* (2006.01)
(52) U.S. Cl. ........................................ 60/338; 192/3.29
(58) Field of Classification Search .................... 60/338; 192/3.29
See application file for complete search history.

(56) References Cited

U.S. PATENT DOCUMENTS

| 5,975,261 | A  | * | 11/1999 | Woerner et al. | ............... 192/3.29 |
| 7,708,126 | B2 | * | 5/2010 | Arhab et al. | .................. 192/3.3 |
| 7,905,337 | B2 | * | 3/2011 | Degler et al. | .................. 60/338 |
| 8,047,344 | B2 | * | 11/2011 | Degler et al. | ................ 192/3.29 |

FOREIGN PATENT DOCUMENTS

| DE | 102007053968 | 6/2008 |
| EP | 1798446 | 6/2007 |

* cited by examiner

*Primary Examiner* — Thomas E Lazo
(74) *Attorney, Agent, or Firm* — Simpson & Simpson, PLLC

(57) ABSTRACT

A force transmission device including at least one input and one output, a hydrodynamic component disposed there between, and a vibration damper disposed subsequent thereto in the force flow, which vibration damper comprises at least one damper input connected torque proof to the hydrodynamic component and at least one axial bearing disposed between the damper input and an element forming a support surface in axial direction. The damper input in the portion of its inner circumference includes a bearing seat for the axial bearing. The bearing seat for the axial bearing is formed by at least one rim portion, folded over at the inner circumference of the damper input and forming a fold-over portion.

14 Claims, 3 Drawing Sheets

FORCE TRANSMISSION DEVICE

FIELD OF THE INVENTION

The invention relates to a force transmission device with at least one input and one output, a hydrodynamic component disposed there between, and a vibration damper disposed in the force flow after the hydrodynamic component, with at least one damper input connected torque proof to the hydrodynamic component, and at least one axial bearing disposed between the damper input and an element forming a support surface in axial direction. The damper input forms a bearing seat for the axial bearing in the portion of the inner circumference of the damper input.

Force transmission devices for applications in drive trains of vehicles, in particular configured as startup and functional units connected in front of a transmission comprise at least one hydrodynamic component between an input and an output and a shiftable clutch device associated with the hydrodynamic component for bridging the power flow through the hydrodynamic component. Furthermore, embodiments are known in which at least one vibration damper is disposed subsequent to the hydrodynamic component in the force flow between input and output. This is typically an elastic coupling, which is used for torque transmission while simultaneously damping the vibrations inducted into the drive train. The vibration damper comprises for this purpose at least one damper input and one damper output, which are coupled with one another through one or plural damper assemblies, respectively comprising means for torque transmission and/or damping coupling. The damper input and the damper output are thus disposed coaxial to one another and rotatable in circumferential direction within limits relative to one another. In a vibration damper connected after the hydrodynamic component, the damper input is connected at least indirectly torque proof to the turbine shell of the hydrodynamic component. The connection can thus be performed indirectly with a turbine shell hub connected in between or it can be performed directly.

BACKGROUND OF THE INVENTION

A force transmission device in which the coupling of the turbine shell of the hydrodynamic component with the damper input is performed through a coupling of the turbine shell with a turbine shell hub and its form locked connection with the damper input are known from the printed document EP 1 798 446 A1. The functions of centering the damper input and the turbine shell are separated herein. The centering of the damper input is performed at a damper hub connected torque proof to the output of the vibration damper, while the centering at the turbine shell hub and the support of the turbine shell by means of an axial bearing is performed between the turbine shell and a freewheeling clutch side disk, which is associated with the freewheeling clutch of the reaction component of the hydrodynamic component. The bearing seat for the axial bearing is thus formed at the turbine shell hub. On the one side, the turbine shell hub or a disk shaped element disposed at said turbine shell hub and including a surface portion oriented in axial direction act as axial support surface for the axial bearing, and on the other side a surface portion configured at the side disk of the freewheeling clutch associated with the stator shell. This embodiment is configured rather large in axial direction, in particular through the presence of the additional turbine shell hub, and it is also characterized by increased assembly complexity besides the increased number of components. The centering diameter for the axial bearing is thus defined by a partial portion of the turbine shell hub forming an outer circumferential portion.

In order to reduce the number of components and the installation space required, the torque proof connection between the turbine shell and the damper input is performed directly, so that a turbine shell hub can be omitted, since the function of support and centering is also taken over by the damper input. An axial bearing assembly comprising at least one axial bearing is provided between the damper input of the vibration damper and the turbine shell of the hydrodynamic component, and between an additional element forming an axial support surface. A side disk of the freewheeling clutch functions as an element forming an axial support surface, which side disk is associated with the reaction component of the freewheeling clutch associated with the hydrodynamic component. For centering, the damper input is extended in radial direction towards the rotation axis. Due to the configuration of the damper input through at least one disk shaped element, the portion usable for centering is characterized by a small thickness, and thus a small and often insufficient axial centering length. Furthermore, the centering is typically not very wear resistant, in particular when at least one of the components of the centering assembly, the hub or the damper input, is not hardened. By configuring this type of centering, a centering of the axial bearing in axial direction is not provided. Said centering in axial direction is implemented in one embodiment by a respectively complex configuration of the side disk of the freewheeling clutch. The freewheeling clutch is a machined pressure cast component, which is complex and expensive to manufacture. Furthermore, embodiments with stamped sheet metal pieces are known, which are characterized by a defined shape, configuring centering surfaces. The geometric configuration of the side disk of the freewheeling clutch is thus rather complex.

In order to extend the centering portion at the damper hub, an embodiment is known from the printed document DE 10 2007 053 968 A1, in which the centering of the vibration damper and of the turbine shell is performed at the damper hub connected with the damper output, the turbine shell is connected directly torque proof to the damper input, and the radial bearing seat of the axial bearing is formed by a protrusion configured in axial direction at the inner circumference. Said protrusion is configured perpendicular to the axial support surface of the axial bearing at the damper input. The bearing seat for the axial bearing, in particular the centering diameter for the axial bearing, is thus determined by the sheet metal thickness of the damper input component. This means that, on one side, the entire connection geometry in particular for the side disk of the freewheeling clutch and for the damper hub has to be adapted to this configuration and on the other side the configuration of the damper input. This measure which provides additional axial centering length thus hardly contributes to an increase in strength.

BRIEF SUMMARY OF THE INVENTION

Thus, it is the object of the invention to improve a force transmission device as described supra, in particular with a turbine shell connected directly torque proof with the damper input, so that said disadvantages are avoided and a bearing seat for the axial bearing can be provided with sufficient centering length for the damper input, and a freely selectable centering diameter for the bearing seat of the axial bearing.

A force transmission device according to the invention with at least one input and one output, a hydrodynamic component disposed there between, and a vibration damper disposed in the force flow after said hydrodynamic component, which vibration damper comprises at least one damper input connected torque proof to the hydrodynamic component and at least one axial bearing disposed between the damper input and an element forming a support surface in axial direction. The damper input forms a bearing seat for the axial bearing in the portion of its inner circumference, the bearing seat for the axial bearing is formed by at least one rim portion folded over at the inner circumference of the damper input and forming a fold-over portion. The folded over rim portion designated as fold-over portion is characterized by the folding designated as folding over or bending of the rim portion by 180°, taking account of fabrication tolerances, which generates a doubling of the sheet metal thickness at the inner circumference of the damper input.

The bearing seat for the axial bearing is configured as radial bearing seat, which is formed by the surface portion(s) of the fold-over portion oriented in radial direction and defining a centering diameter for the axial bearing.

By configuring the bearing seat of the axial bearing according to the invention at a fold-over portion, the bearing seat of the axial bearing is disposed in a portion with increased strength and it is extended in axial direction by the doubling of the centering length for the damper input created through the fold-over.

In an example embodiment, the installation diameter for the axial bearing which is also designated as centering diameter can be varied. This can also be provided or adjusted in a simple manner as a function of the selected length of the rim portion to be folded over, which characterizes the fold-over length. Thus, it is possible to also use the available installation space in an optimum manner besides increasing the strength in the portion of the inner circumference of the damper input and to adapt the contact surfaces disposed at the respective connection elements in an optimum manner. The centering diameter defining the bearing seat for the axial bearing is thus adjustable as a function of the sheet metal thickness and/or of the fold-over length defined by the length of the folded over rim portion.

In an example embodiment, the entire rim portion is folded over at the inner circumference of the damper input, this means, the fold-over portion is entirely formed by the rim portion. This embodiment is characterized by rather high strength and in circumferential direction when additionally deforming the rim portion through a surface which is completely continuous, or when the rim portion is configured slotted, it is characterized by an almost continuous surface, which forms the bearing seat. In this case, the fold-over portion formed by folding over comprises a plurality of fold-over segments extending in circumferential direction which form bearing seat surface portions disposed offset from another in circumferential direction.

In an example embodiment of a fold-over portion made of a plurality of fold-over segments extending in circumferential direction, the fold-over portion only comprises partial portions of the rim portion. In this case, the non-folded over portion of the rim portion can be used as means for limiting the rotation angle between the damper input and the damper output or of a hub connected to the damper output, in that the damper output e.g. engages recesses at the damper hub extending in circumferential direction. A damper input configured like that concentrates a plurality of different functions in the portion of its inner circumference.

In an example embodiment, the axially extending and radially oriented bearing seat of the axial bearing and/or an axial support surface at the damper input can be surface treated and/or can be created or modified through surface treatment. In the first case, the bearing seat can be optimally adapted to the requirements of forming the support surfaces, in particular adapted to their properties in an optimum manner. The second option has the advantage that the bearing seat can be adapted to the shape of the axial bearing; in particular an additional centering in axial direction for the axial bearing can also be fabricated into the bearing seat. Providing such centering at the elements forming the axial support surfaces can then be omitted and the connection elements can be cost effectively produced as components with a simple configuration. Furthermore, providing respective centering at the damper input has the advantage of a simplified assembly of the axial bearing due to the positioning provided thereby.

In an example embodiment, the axial support surface is formed at an axial support element by a face of a disk shaped element oriented towards the axial support. Said element is advantageously configured as a side disc of a freewheeling clutch, in particular of the freewheeling clutch associated with the stator shell of the hydrodynamic component provided in the form of a hydrodynamic speed-/torque converter. Due to the movement of the axial centering assembly into the bearing seat configured in radial direction, or into the component forming said bearing seat, a complicated configuration of a freewheeling side disk can be omitted, which makes it producible in a simple and cost-effective manner.

The fold-over portion configured according to the invention thus corresponds to a portion of the damper input in the portion of the inner circumference, which is bent or folded with reference to a perpendicular in radial direction by 180°. This creates a so-called fold-over portion, which is characterized by a parallel configuration of the folded over rim portion towards the axial support surface at the damper input. The size of the centering diameter is defined by the extension of the fold-over portion in radial direction. The extension of the fold-over portion in radial direction corresponds to the extension between the rounded edge during the bending process and the flange portion forming the bearing seat in radial direction.

Since the damper input is an annular element, the fold-over portion can either be formed by additional deformation in the portion of the inner circumference besides the bending process and the stretching of the material, or particular fold-over elements are formed at the inner circumference during the sheet metal forming process for forming the fold-over portion, which fold-over segments extend in circumferential direction offset from one another and comprise surface portions forming the bearing seat. Thus, for this purpose, radially extending slots are configured in the damper input semi finished part in the portion of the inner circumference, which damper input semi finished part corresponds to an annular disk shaped element, which slots define particular surface portions of the annular element, extending in circumferential direction. After plastic deformation through bending of the surface portions disposed between said slots, the fold-overs or the fold-over portions are generated. Folding over is a sheet metal forming process, which is characterized in that the formed or bent-over portion is aligned at an angle of 180° relative to the base element or relative to the remaining unbent component.

BRIEF DESCRIPTION OF THE SEVERAL VIEWS OF THE DRAWING

The solution according to the invention is subsequently described with reference to figures, wherein.

DETAILED DESCRIPTION OF THE INVENTION

Figure 1:
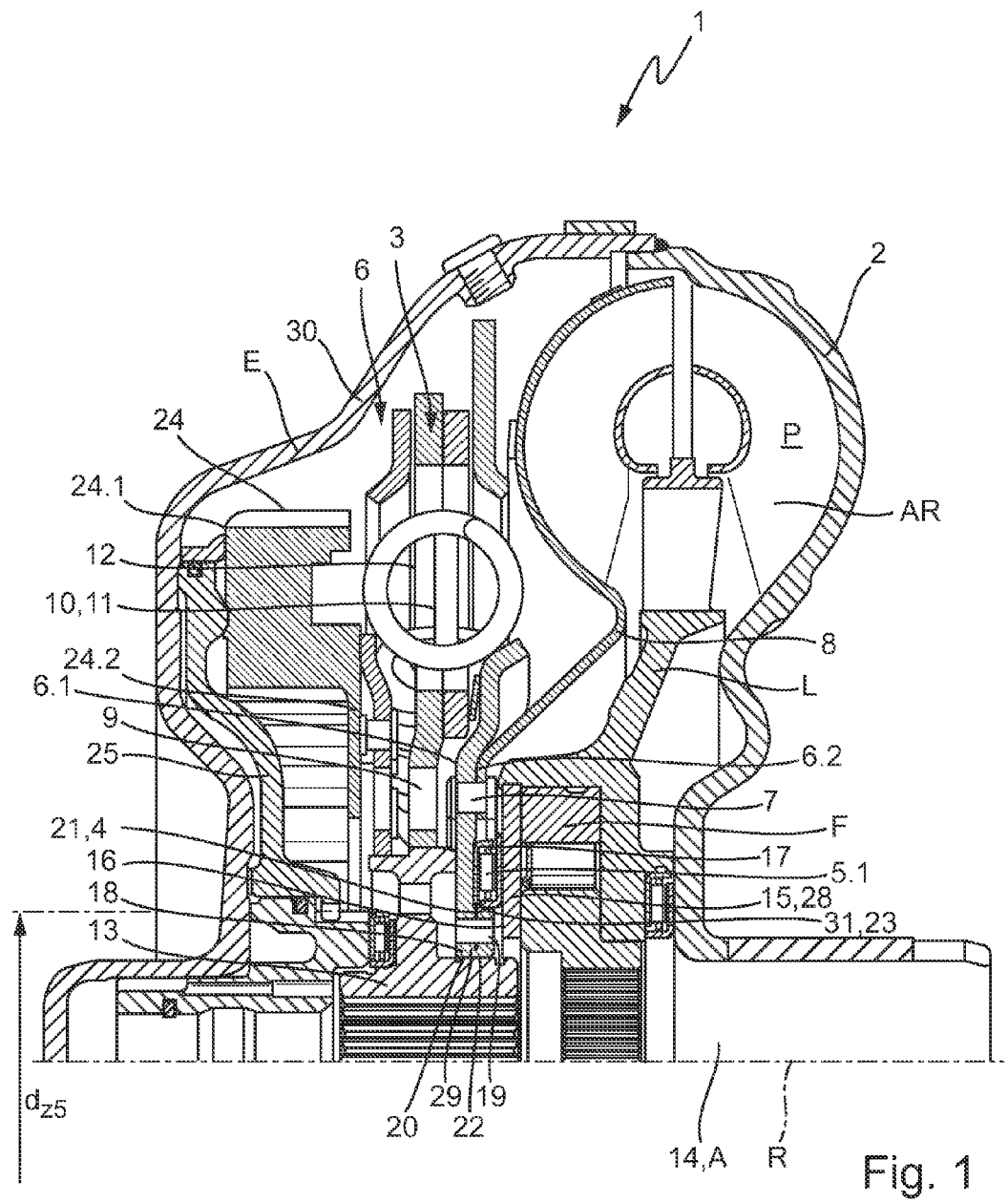
FIG. 1 illustrates an embodiment of a force transmission device according to the invention with an axial bearing seat in a detail of an axial sectional view.

FIG. 1 shows a force transmission device 1 in an axial sectional view, comprising at least an input E and an output A and a hydrodynamic component 2, disposed between input E and output A, and a vibration damper 3 disposed after said hydrodynamic component 2 in the force flow with a configuration of a bearing seat 4 according to the invention for an axial bearing configuration 5 comprising an axial bearing assembly 5, comprising at least one axial bearing 5.1 between the vibration damper 3 and an element forming an axial support surface 16, in particular a connection element in axial direction of the hydrodynamic component 2. Since the force transmission device 1 is configured as a rotatable unit, only the portion visible above the rotation axis R is illustrated in the sectional view. The directional references radial, axial and in circumferential direction thus relate to the position of the rotation axis R. The radial direction is described by a perpendicular to the rotation axis R. Axial means in the direction of the rotation axis R or parallel to it. The circumferential direction corresponds to the direction about the rotation axis R.

The hydrodynamic component 2 comprises at least one bladed shell disposed in the force flow between the input E and the output A, and acting as a pump shell P, which is at least indirectly connected to the input E, this means, connected torque proof directly or through additional components, and a turbine shell T connected to the output A at least indirectly torque proof, which turbine shell T forms an operating cavity AR with the pump shell. When the hydrodynamic component 2 is preferably configured as hydrodynamic speed-/torque converter, it furthermore comprises a stator shell L as a reactive member. Coupling the turbine shell T with the output A of the force transmission device 1 as already stated is not performed directly but through a vibration damper 3 disposed subsequent to the hydrodynamic component 2 in the force flow between the input E and the output A. For this purpose, the turbine shell T is connected torque proof with a damper component functioning in this force flow direction as a damper input 6. The torque proof connection is designated as 7 and is preferably configured as a form locked permanent connection, in particular in the form of a riveted connection. For this purpose, the turbine shell T is configured as a formed sheet metal component in the portion of its inner circumference 8 at the shell bearing the blading, which sheet metal component forms a flange portion for contacting the damper input 6. Thus, a separate turbine hub can be omitted, and the centering can be performed in axial direction through the damper input 6. The vibration damper 3 furthermore comprises at least another damper component functioning as damper output 9, which is coupled to the damper input 6 through torque transmission means 10 and damper coupling means 11. The damper input 6 and the damper output 9 are disposed coaxial relative to one another and rotatable relative to one another in circumferential direction within limits. The torque transmission means 10 and the damper coupling means 11 can thus be formed by separate functional elements or also by identical elements depending on the configuration of the damper assembly. In the illustrated embodiment, they are preferably formed by spring units 12, which are alternatively supported in circumferential direction at the damper input 6 and at the damper output 9 through their end portions pointing away from one another. The vibration damper 3 can be configured as single stage or multistage damper assembly, wherein the particular damper assemblies can be connected in series and/or parallel to one another. Thus, there are no restrictions for the configuration of the device 3 in this respect.

The output A of the force transmission device 1 is formed by a transmission input shaft 14 and by an element connected torque proof with the transmission input shaft 14. The coupling of the damper output 9 with the transmission input shaft 14 is performed herein by means of a hub 13, which is also designated as damper hub. The torque proof coupling between the damper output 9 and the hub 13 can be performed by means of friction locked or form locked connections. The significant fact is that the axial bearing assembly 5 is disposed between the vibration absorber 3 and an axially disposed connection element 28 which forms an axial support surface 16, in particular between the damper input 6 and a disk shaped element, which is supported at the freewheeling clutch F of the reaction component configured as the stator shell L of the hydrodynamic component. The disk shaped element is formed by a freewheeling clutch side disk 15. The centering of the vibration damper 3, in particular of the damper input 6 and of the turbine shell T connected torque proof therewith, is performed through a damper component of the damper input 6 at the hub 13, which damper component is guided in radial direction in the direction to the rotation axis R. The axial bearing assembly 5 which comprises at least an axial bearing 5.1 is thus disposed between the damper input 6 and the element 28, in particular the freewheeling clutch side disk 15 disposed adjacent in axial direction and forming the axial support surface 16. Another axial support surface 17 which is configured pointing to the support surface 16 and which supports the opposite face of the axial bearing 5.1 is formed at the damper input 6 by a surface portion formed at said damper input 6. The arrangement of the bearing seat 4 in radial direction and thus the surface required for centering the axial bearing 5.1 in radial direction is provided according to the invention at the damper input 6. The portion is thus characterized in the portion of its inner circumference 18 through a folded over rim portion, which is configured and embodied, so that it forms at least a fold-over portion 19, extending in circumferential direction, this means, about the rotation axis R. Thus, according to an example embodiment, only such fold-over portion 19 can be provided, which is formed from the folded over rim when extending in circumferential direction, or a plurality of particular fold-over segments 19.1 through 19.n is provided, which form support surface portions for the bearing seat 4. Thus, the particular fold-over portion 19 or the particular fold-over elements 19.1 through 19.n are created by sheet metal forming, in particular by bending about 180°, and thus form a reinforcement of the inner circumference 18 of the damper input 6 through the doubling of the sheet metal thickness formed by the folded over rim portion 29. The end product damper input 6, herein for a multipart damper input 6 the damper component of the damper input 6 which is connected to the turbine shell T is thus characterized in the portion of its inner circumference 18 by the doubling of the sheet metal thickness through sheet metal forming methods. Thus, for the present semi-finished material of the damper input in the form of a disk shaped element, the fold-over of the radially inner rim portion 29 is performed. Through forming, in particular folding a rounded transition or a rounded edge 20 is created at the inner circumference 18 of the damper component of the damper input 6, which inner circumference can be defined by the bending line. The fold-over portion 19 extends substantially parallel to the remaining damper input 6. The surface portion now pointing away from the rotation axis R through the folding over in radial direction, forms the bearing seat 4 for the axial bearing 5.1 in a radial direction. The surface portion 21 is provided before the actual forming process as a surface portion oriented towards the rotation axis R at the inner circumference of the damper input semi finished part. The bearing seat 4 of the axial bearing 5.1 is characterized with respect to its axial extension substantially through the thickness d of the damper input semi finished part 6 in the portion of its inner circumference and characterized after forming additionally through the thickness of the fold-over portion 19. The assembly diameter for the axial bearing 5.1, in particular the centering diameter $d_{Z5}$ for the axial bearing 5.1, is defined by the configuration of the surface portion 21 for forming the bearing seat 4 for the axial bearing 5.1 in radial direction through the fold-over portion 19. The centering diameter $d_{Z5}$ for the axial bearing 5.1 can be defined as a function of the fold-over length $l_{19}$, this means the extension of the fold-over portion 19 in radial direction. The centering diameter $d_{Z5}$ furthermore is a function of the available semi-finished product, in particular of the inner diameter at the damper input semi-finished product and of the rim portion 29 that can theoretically be folded over. The doubling of the rim portion at the inner circumference of the damper input semi-finished material is created by creasing or edge bending, thus the particular fold-over portion 19 besides forming and defining the centering diameter $d_{Z5}$ for the axial bearing 5.1 causes an increase of the stiffness of the damper input 6, in particular of the damper portion of the damper input 6, which is connected torque proof with the turbine shell T in this portion. The centering of the damper input 6 in radial direction is performed through the guide of the rounded edges 20 on a surface portion 22 at the hub 13, forming an outer circumference. The doubling of the rim portion created by the fold-over portion 19 or the particular fold-over elements 19.1 to 19.n increases the axially extending contact portion at the surface portion 22 forming the outer circumference. The surface portion 21 at the fold-over portion 19 which is outward oriented in radial direction and which functions as a support 4 for the axial bearing 5.1 in radial direction can be machined, in particular when increased demands are placed upon the centering diameter $d_{Z5}$ or a contour of the support 4 is required, which is adapted to the configuration of the axial bearing, e.g. for generating means 31 for centering the axial bearing 5.1 in axial direction, in order to position the axial bearing 5.1 in axial direction during transport or assembly. In an example embodiment, form locked elements are provided at the bearing support 4, which can be brought into operative engagement with elements at the axial support 5.1, which are configured complementary thereto, and so that they can be brought into operative engagement, e.g. for creating a snap fit 23.

Figure 2:
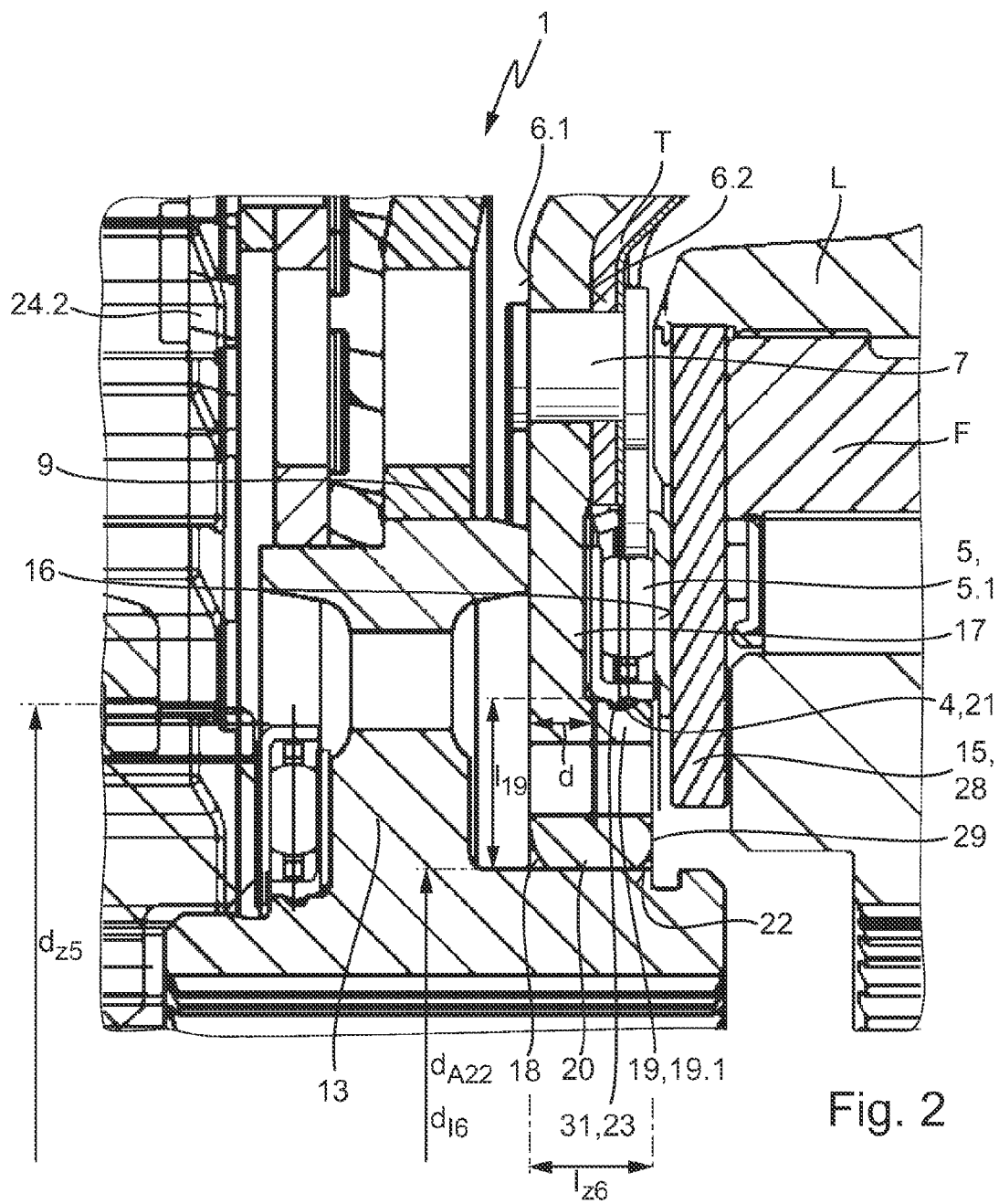
FIG. 2 illustrates a detail of a view according to FIG. 1.

FIG. 2 illustrates a detail view according to FIG. 1, in which the axial bearing assembly 5 is illustrated again in detail. The damper input 6 is visible here, in particular the damper portion of the damper input 6 in multi-component construction in the final state connected torque proof with the turbine shell T. Thus, the inner diameter $d_{f6}$, which is defined by the rounded edge 20, corresponds to the diameter $d_{422}$ of the surface portion 22 forming the outer circumference. The damper input semi-finished part is thus characterized by a much smaller inner diameter, which defines the fold-over length $l_{19}$ and thus the extension of the fold-over in radial direction. Furthermore, the axial support surface 17 is visible at the face 62 of the damper input 6 in the portion of the inner circumference 18 oriented towards the hydrodynamic component 2. It is disposed in radial direction above the surface portion 21, which forms the bearing seat 4 and which is defined by the fold-over portion 19. Furthermore, the additional axial support surface 16 is visible, which is configured at a freewheeling clutch side disk 15, which coupled to the freewheeling clutch F of the stator shell L, wherein no particular requirements exist with respect to the configuration of the contact surface, and thus the freewheeling side disk 15 can be manufactured cost effectively in a particularly simple manner. It is crucial that the centering diameter $d_{Z6}$ can be set differently as a function of the available support surface at the freewheeling clutch side disk 15 and of the damper input semi-finished product by selecting the length of the rim portion 29 to be folded over. The thickness d of the damper input 6 before folding over determines the centering length $l_{Z6}$ of the damper input 6 through the doubling of the thickness d after folding over.

Additional components of the force transmission device 1 are illustrated further in FIG. 1. It comprises an actuatable clutch device 24, which is preferably configured in the form of a friction locked clutch device, in particular a wet running multidisc clutch and which is disposed between the input E and the output A, wherein the actuatable clutch device 24 includes a first clutch component 24.1, which is connected to the input E at least indirectly torque proof, and a second clutch component 24.2, which is connected to the output A through the vibration damper 3, in particular to the damper input 6. The damper input 6 is thus configured with plural components, wherein the particular damper components are connected to one another torque proof. The first and the second clutch component 24.1, 24.2 can be brought at least indirectly into operative engagement with one another through at least one adjustment device 25. Each of the clutch components 24.1 and 24.2 comprises at least one friction surface bearing or friction surface forming element, in embodiments as a multidisc clutch, it comprises a support with friction surface bearing and/or friction surface forming elements disposed therein movable in axial direction and coupled torque proof thereto. The adjustment device 25 can be at least partially actuated by a pressure medium. The input E of the force transmission device 1 is formed by the pump shell P or by an element coupled torque proof thereto, in particular by a co-rotatable housing 30.

Figure 3A:
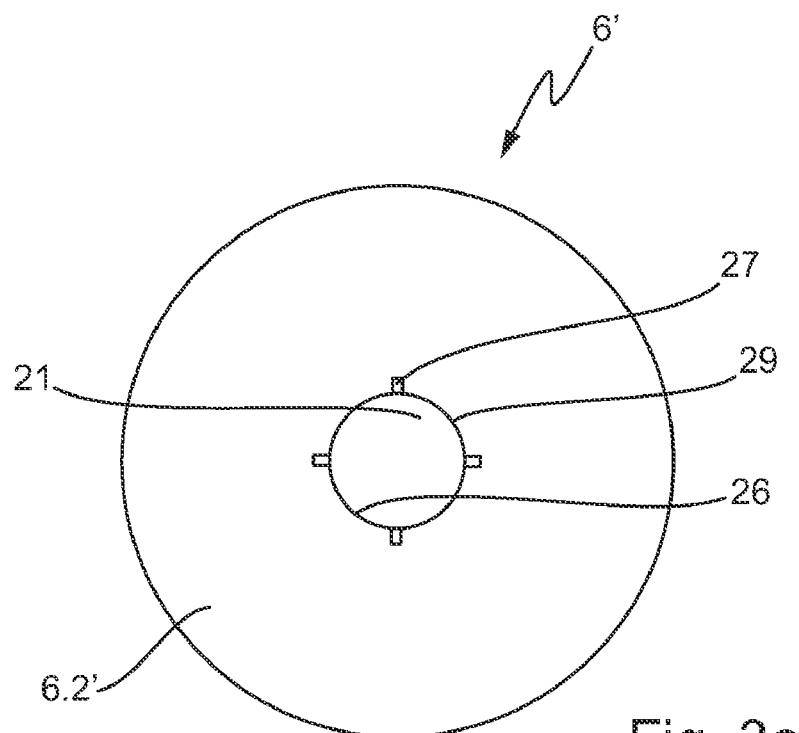
FIGS. 3a and 3b illustrate a damper input semi-finished part and a damper input component after a sheet metal forming process in a view towards the face at the axial bearing.
Figure 3B:
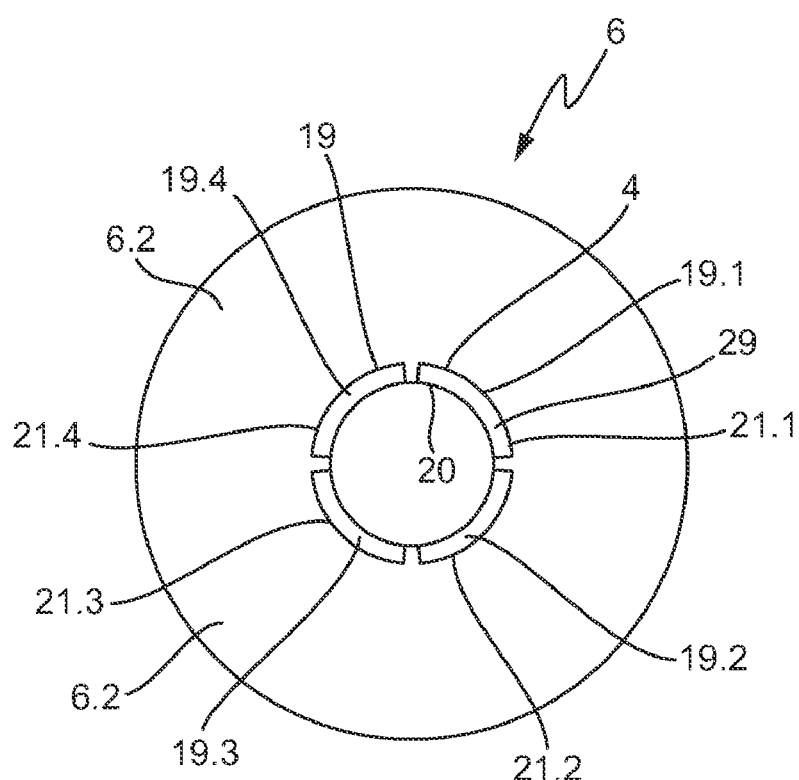

FIGS. 3a and 3b illustrate an embodiment with a fold-over portion 19 formed from fold-over segments 19.1 through 19.4, which form surface portions 21.1 through 21.4, which form the bearing seat 4 for the axial bearing 5.1. Thus, the damper input semi-finished product 6' illustrated in FIG. 3a is provided in not yet deformed state in the portion of its inner circumference 26 with radially oriented slots 27 sized according to the desired fold-over length, wherein the surface portions disposed between two slots 27 and disposed offset to one another in circumferential direction and defining a rim portion 29 are folded over, in particular folded by 180°, form the particular fold-over portions 19.1 through 19.4. Thus, no additional material deformation or stretching of the material is required in the fold-over portion 19, and the actually provided sheet metal thickness can be provided for forming the fold-over portion 19.

With respect to machining the support surfaces 16, 17 for the axial support 5.1 there is a plurality of options. In an example embodiment, only the support surface 17 at the damper input 6 is machined, in particular when the bearing seat 4 oriented in radial direction has to be machined anyhow.

The solution according to the invention is suitable for any embodiment of a force transmission device 1 with a vibration damper 3 disposed in the force flow subsequent to the turbine shell T, independently from the configuration in two or three channel construction.

| Reference Numerals and Designations | |
|---|---|
| 1 | force transmission device |
| 2 | hydrodynamic component |
| 3 | vibration damper |
| 4, 4.1-4.n | bearing seat |
| 5 | axial bearing assembly |
| 5.1 | axial bearing |
| 6 | damper input |
| 6.1, 6.2 | face |
| 7 | connection |
| 8 | inner circumference of the turbine shell |
| 9 | damper output |
| 10 | means for torque transmission |
| 11 | means for damper coupling |
| 12 | spring units |
| 13 | hub |
| 14 | transmission input shaft |
| 15 | freewheeling clutch side disk |
| 16 | contact surface |
| 17 | contact surface |
| 18 | inner circumference |
| 19 | fold-over portion |
| 19.1-19.4 | fold-over segments |
| 20 | rounded edge |
| 21, 21.1-21.4 | surface portion |
| 22 | surface portion forming an outer circumference |
| 23 | snap seat |
| 24 | shiftable clutch device |
| 24.1 | first clutch component |
| 24.2 | second clutch component |
| 25 | adjustment device |
| 26 | inner circumference |
| 27 | slot |
| 28 | connection element forming an axial support surface |
| 29 | rim portion |
| 30 | housing |
| 31 | centering means |
| P | pump shell |
| T | turbine shell |
| L | stator shell |
| AR | operating cavity |
| R | rotation axis |
| F | freewheeling clutch |
| E | input |
| A | output |
| d | thickness |
| $d_{ZS}$ | centering diameter |
| $d_{I6}$ | inner diameter damper input |
| $d_{A22}$ | outer diameter |
| $l_{19}$ | fold-over length |
| $l_{Z6}$ | centering length |

What I claim is:

1. A force transmission device comprising:
at least one input and one output;
a hydrodynamic component disposed there between; and,
a vibration damper disposed subsequent thereto in the force flow, which vibration damper comprises at least one damper input connected torque proof to the hydrodynamic component and at least one axial bearing disposed between the damper input and an element forming a support surface in axial direction, wherein the damper input in the portion of its inner circumference comprises a bearing seat for the axial bearing, wherein the bearing seat for the axial bearing is formed by at least one rim portion, folded over at the inner circumference of the damper input and forming a fold-over portion.

2. The force transmission device according to claim 1, wherein the fold-over portion comprises a plurality of circumferentially extending fold-over segments disposed behind one another, forming surface portions, which form the bearing seat.

3. The force transmission device according to claim 1, wherein the bearing seat for the axial bearing is configured as radial bearing seat, which is formed by the surface portion of the fold-over portion, which is oriented in radial direction, and defines a centering diameter for the axial bearing.

4. The force transmission device according to claim 3, wherein the centering diameter defining the bearing seat for the axial bearing is adjustable as a function of the thickness and/or of the fold-over length defined by the length of the folded over rim portion.

5. The force transmission device according to claim 4, wherein the surface portion forming the bearing seat for the axial bearing and/or an axial support surface disposed at the damper input are surface finished.

6. The force transmission device according to claim 1, wherein the damper input forms a support surface in axial direction for the axial bearing.

7. The force transmission device according to claim 1, wherein the bearing seat for the axial bearing is surface treated.

8. The force transmission device according to claim 1, wherein means for centering the axial bearing are provided at the bearing seat in axial direction.

9. The force transmission device according to claim 8, wherein the means comprises form locking or friction locking elements, which interact with respective form locking or friction locking elements at the axial bearing.

10. The force transmission device according to claim 1, wherein the vibration damper comprises a damper output which is disposed coaxial to the damper input and rotatable relative thereto in circumferential direction within limits, and connected torque proof to a hub forming the output of the force transmission device or connected torque proof thereto, wherein the damper input is centered a hub, and the length of a centering portion is defined in axial direction as a function of the width of the damper input in the fold-over portion.

11. The force transmission device according to claim 1, wherein an element forming the axial support surface is formed by a side disk of the freewheeling clutch.

12. The force transmission device according to claim 11, wherein the freewheeling clutch is formed by a stator shell of the hydrodynamic component.

13. The force transmission device according to claim 1, wherein the fold-over portion (19) is formed entirely by the rim portion (29).

14. The force transmission device according to claim 1, wherein the fold-over portion only comprises partial portions of the rim portion, and the not folded over portion of the rim portion forms means for limiting the rotation angle between the damper input and the damper output or a hub.

* * * * *